United States Patent [19]
Genders et al.

[11] Patent Number: 5,967,603
[45] Date of Patent: Oct. 19, 1999

[54] SEAT MOUNTED AIRBAG WITH DEPLOYMENT FORCE CONCENTRATOR

[75] Inventors: John Genders, Benfleet; Michael Steward, Swaffham; Mark Morrison, Boothville, all of United Kingdom

[73] Assignee: Johnson Controls Technology Company, Plymouth, Mich.

[21] Appl. No.: 08/937,564

[22] Filed: Sep. 25, 1997

[51] Int. Cl.⁶ .................... B60N 2/42; B60R 21/22
[52] U.S. Cl. .................... 297/216.13; 297/216.1; 280/730.2
[58] Field of Search .................... 297/216.13, 216.1, 297/DIG. 3, 452.41; 280/728.1, 729, 730.2

[56] References Cited

U.S. PATENT DOCUMENTS

| | | |
|---|---|---|
| 5,498,030 | 3/1996 | Hill et al. . |
| 5,553,887 | 9/1996 | Karlow et al. . |
| 5,564,736 | 10/1996 | Kim . |
| 5,577,765 | 11/1996 | Takeda et al. . |
| 5,630,615 | 5/1997 | Miesik . |
| 5,639,111 | 6/1997 | Spencer et al. . |
| 5,651,582 | 7/1997 | Nakano . |
| 5,678,853 | 10/1997 | Maly . |

FOREIGN PATENT DOCUMENTS

| | | |
|---|---|---|
| 2185296 | 3/1997 | Canada . |
| 0 782944 A1 | 7/1997 | European Pat. Off. . |
| 8258660 | 10/1996 | Japan . |
| 971212 | 3/1997 | Japan . |
| 2 293 355 | 3/1996 | United Kingdom . |

*Primary Examiner*—Milton Nelson, Jr.
*Attorney, Agent, or Firm*—Harness, Dickey & Pierce, P.L.C.

[57] ABSTRACT

A vehicle seat having an inflatable airbag therein which deploys through a tear line such as a seam in the seat trim cover. A force concentrator is provided to ensure deployment of the airbag through the intended location rather than rupturing the trim cover elsewhere. The force concentrator includes two panels of a flexible and substantially non-stretchable material having a strength sufficient to withstand the force of the inflating airbag without tearing. The panels are attached to the trim cover at the tear line and extend away from the tear line in opposite directions. Distal ends of the panels are joined to one another forming a sleeve that circumscribes the airbag.

40 Claims, 4 Drawing Sheets

SEAT MOUNTED AIRBAG WITH DEPLOYMENT FORCE CONCENTRATOR

BACKGROUND AND SUMMARY OF THE INVENTION

The present invention relates generally to a vehicle seat having an airbag contained therein and in particular to such a seat with a force concentrator adjacent the airbag to concentrate the force of the inflating airbag at a designed seam in the trim cover to ensure deployment of the airbag through the seam.

In recent years, automobile manufacturers have directed increasing attention to providing improved protection for vehicle occupants. One method of doing so is to provide an inflatable airbag mounted to the vehicle seat to proved additional protection to the seat occupant or to an occupant located rearward of the seat.

Generally, seat mounted airbags fall into two different categories. One type deploys from a visible, discrete door on the seat back or seat bottom. Another type of airbag is stowed beneath the seat trim cover and is designed to deploy through the trim cover. An advantage of using an airbag with a discrete door is that deployment of the airbag through a door is used in frontal airbags in steering wheels and instrument panels. The technology for providing consistent and repeatable deployment of the airbag through the door is well developed. A disadvantage is that the airbag is to locations on the seat where the door will not interfere with the comfort of the seat occupant. Another disadvantage is that the seat cover needs a trimmed recess to install the airbag module into, with cost, complexity and appearance issues. If it is desired for the airbag to deploy through the front corner of the seat back, such as the location of a bolster seam, a discrete door cannot be used. Rather, the airbag must be beneath the seat back trim cover, and typically beneath a foam pad, where it does not adversely impact the seat comfort. However, when the airbag deploys through the trim cover, there are considerably more variables involved in providing consistency in airbag deployment and airbag in-position timing.

The seat trim cover provides numerous variables affecting airbag deployment. The trim cover fabric type, such as cloth, leather, vinyl, etc. and combinations of these various types, all behave differently and have different tensile and tear strengths. In addition, different materials of the same types, such as different cloth fabrics have different tensile strengths, tear strengths, and elongation etc. that affect the manner in which an airbag deploys through the trim cover if the trim cover material is ruptured to deploy the airbag. Other variables introduced by the trim cover include the strength of the trim cover scrim layer or backing and the strength of the thin foam layer typically laminated to the trim cover fabric. All of these variables are also effected by high and low temperatures.

Wear of the trim cover over time and trim cover damage by cutting, puncturing, cigarette burns, etc., also introduce variables in airbag deployment. For example, a cut in the trim cover at a location other than the intended deployment can cause the trim cover to rupture at the wrong location, resulting in the airbag being out of position.

Other variations in the deployment can be introduced by the density and type of the seat foam pad, the presence or absence of a border wire embedded in the foam pad, the trim cover attachment locations, the types of attachments and the deployment seam location relative to the airbag module.

To reduce or eliminate the effects of the above trim cover variables, it has been proposed to deploy airbags through a seam in the trim cover by rupturing the seam a opposed to rupturing the trim cover material itself. The seam strength is controlled by the thread strength and not fabric strength. Numerous variables affect the strength of the seam. These include the seam type, number of stitches per inch, thread strength, the seam arrangement, styling and welting. Most of these variables can be controlled in the design of the trim cover. As a result, greater deployment consistency can be achieved with deployment through a trim cover seam. However, even with designed deployment through a seam, the trim cover will introduce variations in airbag deployment. Different elongation characteristics between different trim cover materials will affect deployment. A weak spot may result in the cover tearing instead of the seam.

To eliminate trim cover variability, a force concentrator is used that surrounds the folded airbag and concentrates, or directs, the force of the inflating airbag to the designed deployment seam. This causes the seam to rupture and allow the airbag to deploy therethrough. By directing the force to the seam through the force concentrator, the trim cover material is not loaded. As a result, the trim cover characteristics do not influence the airbag deployment. Consistent bag deployment can be achieved with a variety of different cover materials.

The force concentrator consists of two panels of sheet material joined into the deployment seam and extending away from the seam in opposite directions. The panels extend beneath the trim cover and surround the airbag and a portion of the seat frame. The panel ends distal to the seam are joined to one another, whereby the concentrator panels forming a sleeve circumscribing the airbag and seat frame.

Depending on the location of the airbag and seat frame, one panel of the force concentrator may pass through a slot in the seat cushion pad to meet with, and join to, the distal end of the other panel to form the sleeve. The force concentrator panels are made of a substantially non-stretchable material with a tensile strength sufficient to withstand the force of the inflating airbag without tearing. The concentrator material must be strong enough to transmit the deployment force to the seam and rupture the seam. One material with the necessary tensile strength is the material used to make airbag itself. Other high strength sheet materials may be used as well.

The force concentrator can be mounted to a vehicle seat at any location where it is desired to deploy an airbag. For example, for a side airbag, the force concentrator can be mounted along the side of the seat in the bolster area of either the generally horizontal seat bottom or the generally upright seat back. The force concentrator can also be mounted at the upper end of the seat back of a front seat for rearward inflation to protect a rear seat occupant.

The force concentrator also assists the performance of the airbag by controlling and managing the variable energy output from the airbag due to different climatic conditions. At low temperatures such as −35° C., the gas generator has considerably less energy available compared to its performance at 21° C. An estimate would be a 30 percent drop in gas generator performance at the low temperature. Without the force concentrator directing the available force onto the deployment seam, the trim cover may fail to rupture during the airbag deployment. To overcome this condition, a weaker deployment seam could be used, however, this would have an adverse affect on the durability of the trim cover.

At high temperatures such as 40° C., the gas generator has significantly more energy available. This could lead to failure of the wrong seam and/or damage to the trim cover and its tie downs in the foam pad. The result maybe improper deployment of the airbag. The force concentrator prevents this by containing the force and directing it solely onto the deployment seam. The use of the force concentrator ensures a low temperature deployment by directing the reduced energy available onto the deployment seam. The use of the strongest trim cover deployment seam feasible can then be used for a given low temperature gas generator performance. Furthermore, airbag mal-deployment caused by the wrong seam or trim cover rupture during airbag deployment at high temperatures is prevented by the force concentrator.

Further objects, features and advantages of the invention will become apparent from a consideration of the following description and the appended claims when taken in connection with the accompanying drawings.

DETAILED DESCRIPTION OF THE PREFERRED EMBODIMENT

Figures 1, 2:
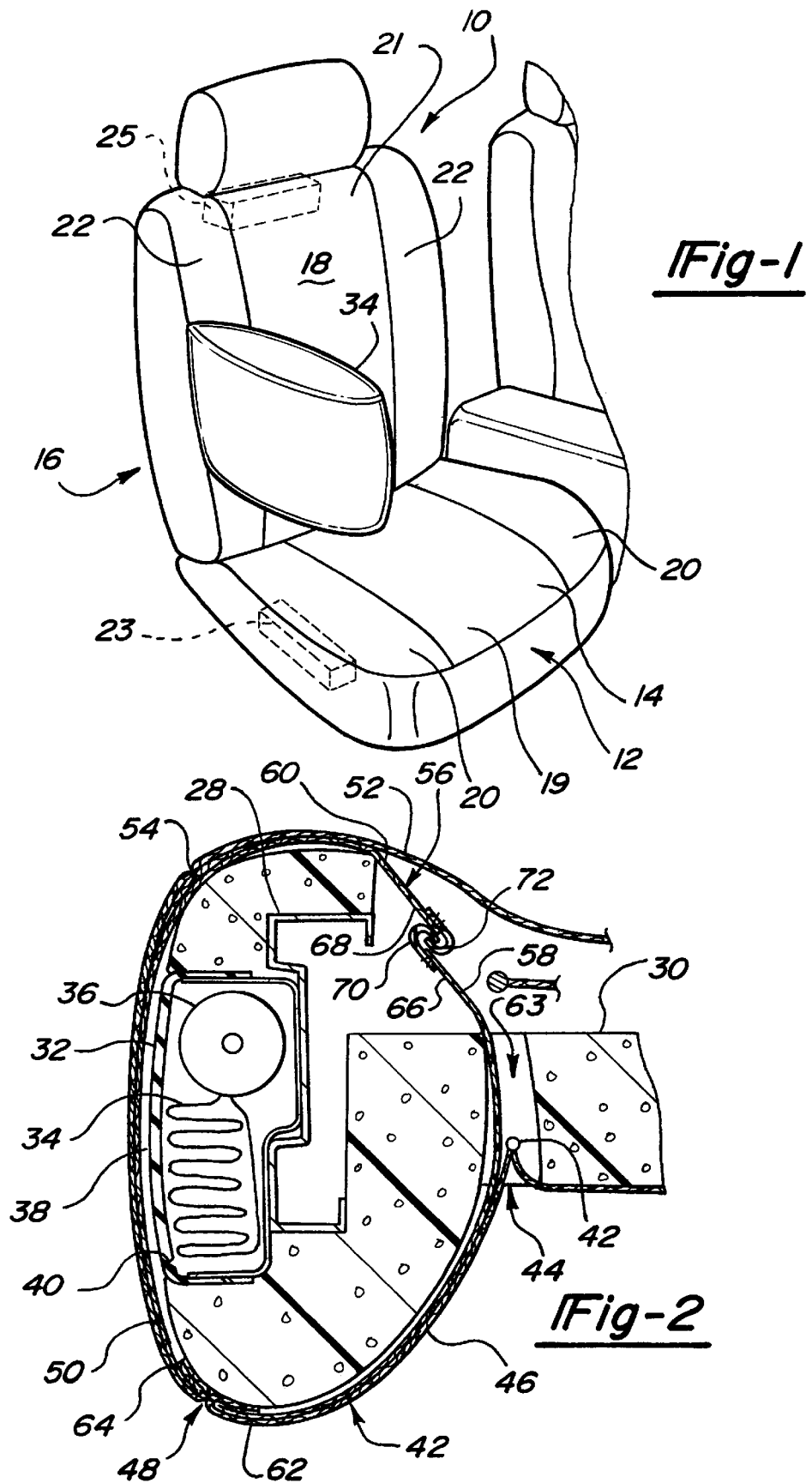
FIG. 1 is a perspective view of a vehicle seat assembly having a side airbag in the seat back with the force concentrator according to the present invention.
FIG. 2 is a sectional view of the seat back as seen from substantially the line 2—2 of FIG. 1.

A seat assembly according to the present invention containing an airbag with the force concentrator is shown in FIG. 1 and designated generally at 10. Seat assembly 10 includes a lower, generally horizontal, seat bottom 12 forming a horizontal seating surface 14. A seat back 16 extends generally upwardly at the rear end of the seat bottom 12. The seat back 16 forms an upright front seating surface 18 against which a seat occupant rests their torso. The seat bottom has a center portion 19 and left and right side bolsters 20 while the seat back has a center portion 21 and left and right side bolsters 22. The seat bottom 12 and/or the seat back 16 can be used to mount a side airbag to provide additional occupant protection. A seat bottom mounted side airbag module 23 is shown in phantom. In addition, a rear seat occupant airbag module 25 is shown in phantom at the upper end of the seat back 16. These are likely locations for an airbag within a seat assembly. However, the present invention can be utilized anywhere on a seat assembly that an airbag is mounted for deployment through a trim cover seam, including sides of rear seats for rear seat side airbag installation. The invention will be described below in the connection with a seat back mounted side airbag 34 shown in FIG. 1.

The seat back 16 includes a trim cover 24 which is made of a plurality of pieces of sheet material joined together at seams. Most notably, the trim cover 24 includes a bolster seam 48 at the front corner of the bolster 22. The number and locations of the seams is determined partially by functional considerations to develop a tight, form fitting, trim cover and also by styling considerations.

With reference to FIG. 2, the bolster 22 of the seat back is shown in detail. The seat includes a frame having a frame member 28. Also included is a resilient pad 30 which may be made of one or more separate pieces of material such as polyurethane foam. An airbag module 32 is mounted to the frame member 28. A typical airbag module includes a folded airbag 34 and a gas generator 36 which provides an inflation gas for the airbag. The generator 36 is coupled to a control system (not shown) that controls the operation of the generator and inflation of the airbag. The module 32 is mounted to the frame member 28 by fasteners (not shown) in a conventional manner. The present invention is not related to a particular configuration of the airbag module. Nor is it necessary that the airbag be part of a module or have the gas source mounted to the seat assembly. An airbag mounted separate from the gas source can be utilized if desired.

As shown in FIG. 2 the airbag module includes a housing 38 having a split line 40. The housing ruptures at the split line for deploying the airbag through the housing.

The trim cover 24 is attached to the seat back and substantially covers the frame member 28, module 32 and the pad 30. The trim cover is attached at a tie down 44 to a wire 42 embedded into the pad 30. The tie down can be accomplished by hog rings or other fasteners. Alternative tie downs, such as Velcro®, can be used as well. The tie down 44 is located generally where the center portion 21 joins the bolster 22.

A trim cover 24 is formed of separate pieces of material joined together by seams. For example, pieces 46 and 50 are joined together by the seam 48 at the corner of the bolster. Likewise, trim cover piece 52 is joined to the piece 50 by the seam 54.

The airbag deploys by rupturing of the seam 48. To ensure that the seam 48 ruptures when the airbag deploys, the trim cover is provided with the force concentrator 56 of the present invention which concentrates, or directs, the force of the inflating airbag onto the seam 48 to ensure the seam ruptures. The concentrator 56 is formed of two panels, 58 and 60 of a substantially non-stretchable material having a tensile strength sufficient to withstand the force of the inflating airbag without tearing. The panel 58 has an end 62 that is sewn into the seam 48 by the seam thread and extends away from the seam 48 between the trim cover piece 46 and the pad 30. Likewise, the panel 60 has an end 64 that is sewn into the seam 48 and extends away from the seam between the pad and the trim cover piece 50.

The force concentrator panel 58 extends through a slot 63 in the pad 30. The force concentrator panels have ends 66 and 68 that are distal to the seam 48 and are joined to one another. As shown in FIG. 2, the distal ends are provided with hook fastener strips 70 and 72 which are joined together. The force concentrator panels thus form a sleeve circumscribing the airbag and frame member 28 as well as a portion of the pad in the side bolster. By circumscribing the airbag and frame, the force concentrator will be loaded in tension when the airbag deploys and transmit the force to the seam 48, eventually causing the seam 48 to rupture and allow the airbag to deploy there through. Since the force concentrator is non-stretchable and does not itself tear in response to the airbag forces, the inflation forces are carried by the sleeve and are not applied to the trim cover material. As a result, the trim cover material is not loaded and the strength of the trim cover material does not affect airbag deployment. Furthermore, since the force concentrator does not stretch, there is no stretching of the trim cover. By surrounding the frame member 28, the force concentrator is anchored to the seat.

Since the trim cover does not carry the airbag force, the tie down 44 can be of a conventional design. No reinforcement of the tie down is needed. Without the concentrator the tie down would experience all the deployment load, causing damage to or failure of the tie down in the foam and the trim cover.

Figure 8:
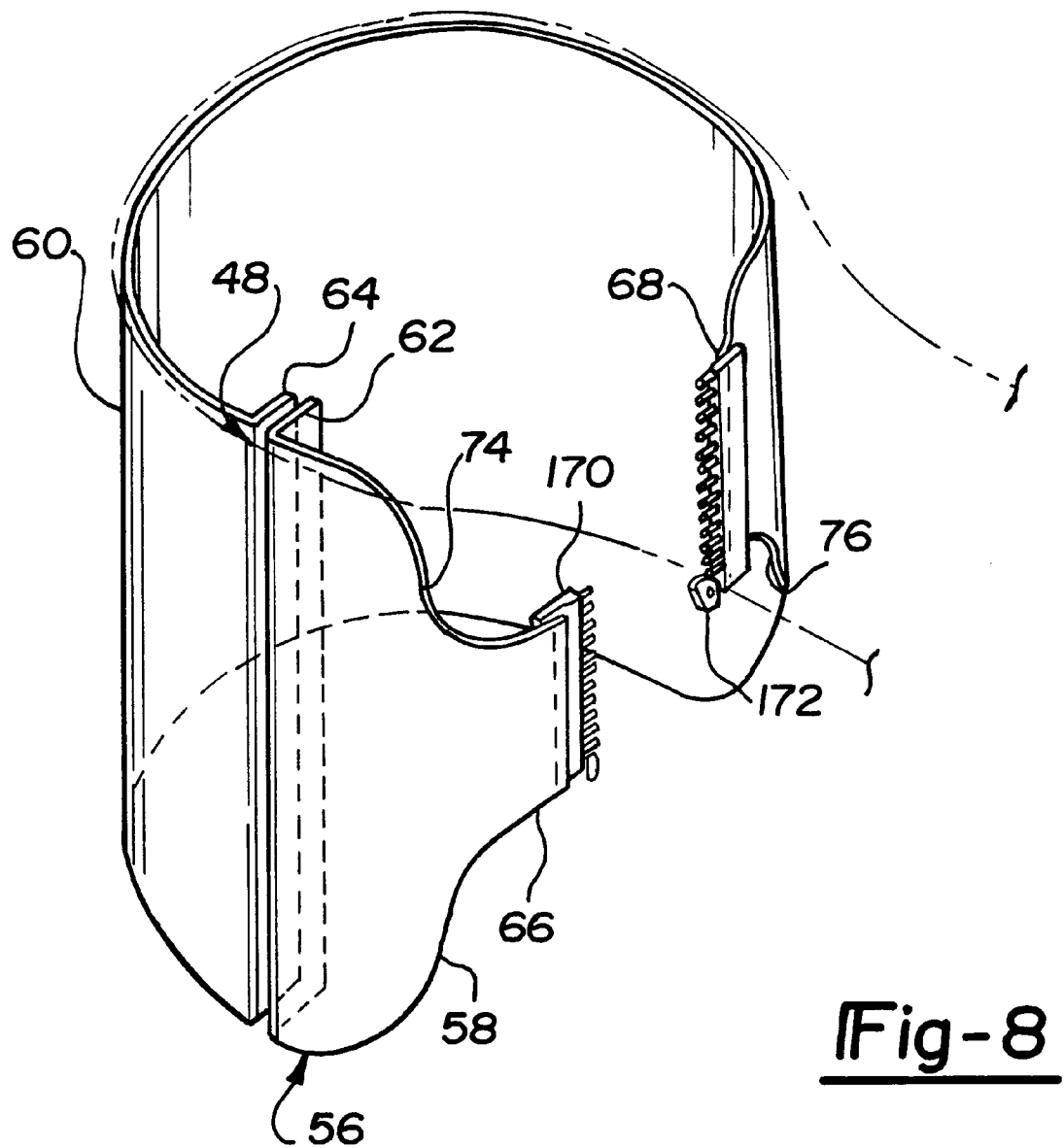
FIG. 8 is a perspective view of the force concentrator like that shown in FIG. 3 with a zipper fastener.

The force concentrator panels can be made of any flexible material that is substantially non-stretchable and has a strength to withstand the force of the inflating airbag without tearing. One suitable material is the same material used in the airbag itself. Other high strength materials may be used as well. The hooks, fastener strips 70 and 72 can be made of metal having a slot for sewing to the force concentrator panels in a similar manner as seat belt buckles are attached to the belt webbing. Plastic hook fastener strips may be used as well and may be preferred if the plastic can be sewn directly to the panels of the force concentrator. Other types of fasteners may be used such as a snap fasteners, Velcro, zippers, buckles, complementary hooks and slots, etc. if sufficient strength can be achieved. With reference to FIG. 8, a force concentrator 56 is shown in which the distal ends 66, 68 of the panels have complementary zipper elements 170, 172 coupled thereto for attachment of the distal ends of the panels to one another.

Figure 3:
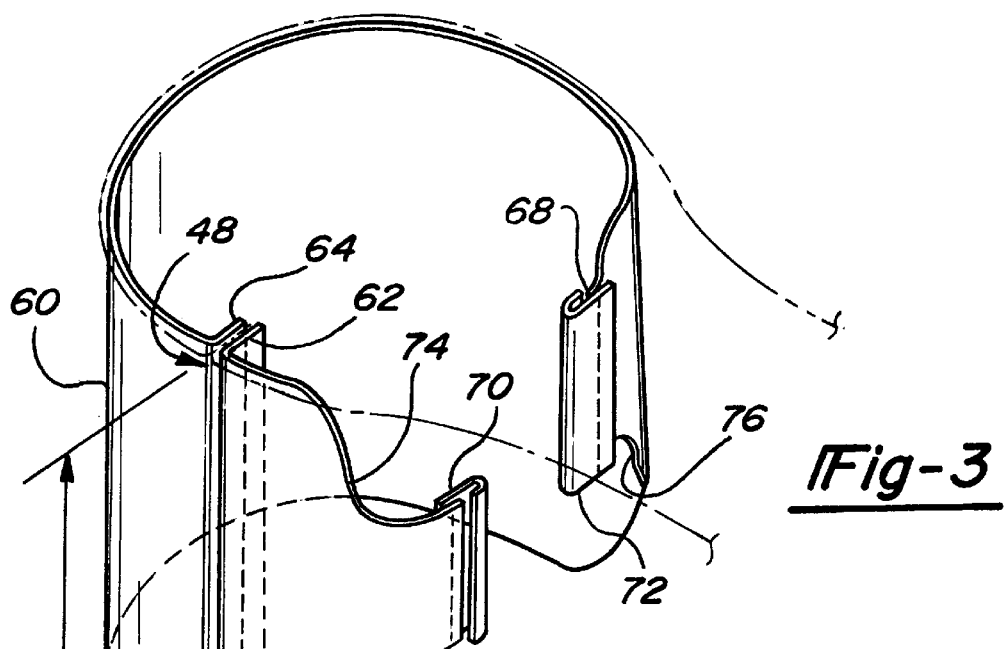
FIG. 3 is a perspective view of the force concentrator.
Figure 4:
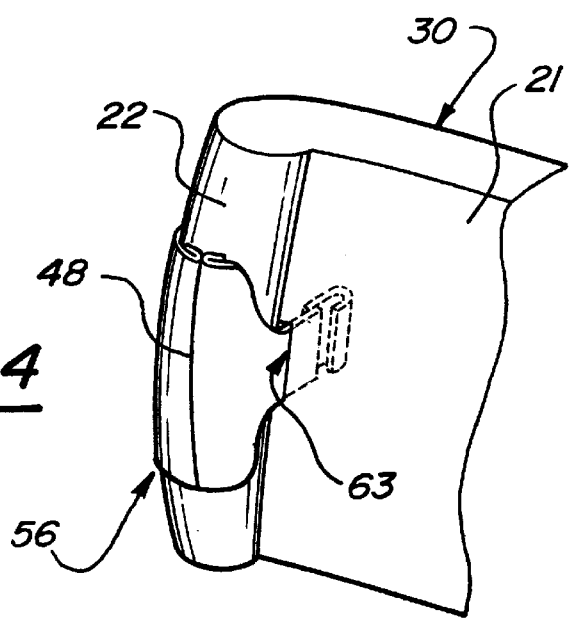
FIG. 4 is a perspective view of the seat back foam pad and force concentrator.
Figure 5:
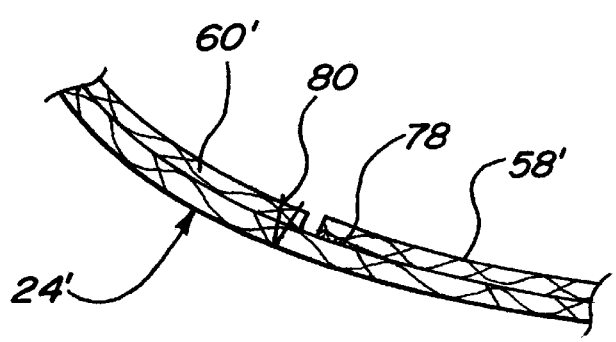
FIG. 5 is a sectional view through the trim cover and force concentrator showing the concentrator attached to a tear line that is not formed by a trim cover seam and showing adhesive attachment of the force concentrator to the trim cover.

The longitudinal length of the force concentrator along the seam 48 is shown as the dimension A in FIG. 3 is longer than the longitudinal length of the distal ends 66 and 68 of the force concentrator panels. This is the result of a step down portion 74 in the panel 58 where the longitudinal extent of the force concentrator is rapidly decreased leading to the distal end 66. The panel 60 has a circumferential extent in which the longitudinal length of the sleeve is essentially constant and then a step down portion 76 leading to the distal end 68. By providing a stepdown prior to the slot 63 in the pad 30, the longitudinal extent of the slot can be significantly less than the longitudinal dimension A of the concentrator. By reducing the longitudinal extent of the slot 63, the weakening affect of the slot on the pad 30 and its durability is significantly minimized. Test results show a distal end longitudinal length of one-third the module length is adequate, allowing minimal pad degradation to obtain assembly access through the foam pad, as long as the distal end is kept to the center of the module length. An advantage of providing a relatively large longitudinal dimension A is that the concentrator covers most, if not all or more, of the longitudinal extent of the folded airbag. This protects the trim cover over the entire area of the cover that may be loaded by the deploying airbag and prevents tearing of the trim cover at a location other than the seam 48 and prevents the trim cover from ballooning. The term "longitudinal" is in reference to the longitudinal axial direction of the tubular sleeve formed by the concentrator. Another advantage of the step down in the longitudinal extent of the concentrator is a reduction in the quantity of the material required to make the concentrator while still maintaining a large longitudinal extent along the seam 48.

By attaching the distal ends of the concentrator panels to one another, as opposed to attaching the ends to the frame member 28, several benefits and advantages are achieved. A primary benefit is to facilitate the assembly of the vehicle seat. The seat is assembled in a conventional manner for vehicle seat assemblies with the airbag module being attached to the frame and the foam being applied to the frame prior to application of the trim cover. The trim cover can be applied in a conventional manner by rolling the trim cover down over the seat back from the top to the bottom of the seat back. When the cover is applied over the airbag, the panel 58 is passed through the slot 63 in the foam and the two distal ends are coupled to one another. The trim cover is then continued down the seat back to its lower end.

The invention has been described with the airbag deploying through a sewn seam 48 in the trim cover. The force concentrator can be utilized at seams that are formed with adhesives, by sonic welding, or other methods that do not require a stitched seam. As long as the force concentrator is joined to the trim cover with sufficient strength to rupture the trim cover seam, the force concentrator will function according to the invention.

The deployment location in the trim cover need not be at a seam. It is possible to join the force concentrator panels to the same piece of the trim cover adjacent a desired tear line. The panels can be joined to the trim cover by sewing, sonic welding, adhesives, etc. When the airbag inflates, the force concentrator panels will pull on the trim cover on opposite sides of the tear line, causing the trim cover to rupture at the tear line.

The panels of the force concentrator have each been shown as single piece members. It is possible to form these panels of multiple pieces joined together if desired. This may help shape the panels to provide an attractive trim cover.

Figure 6:
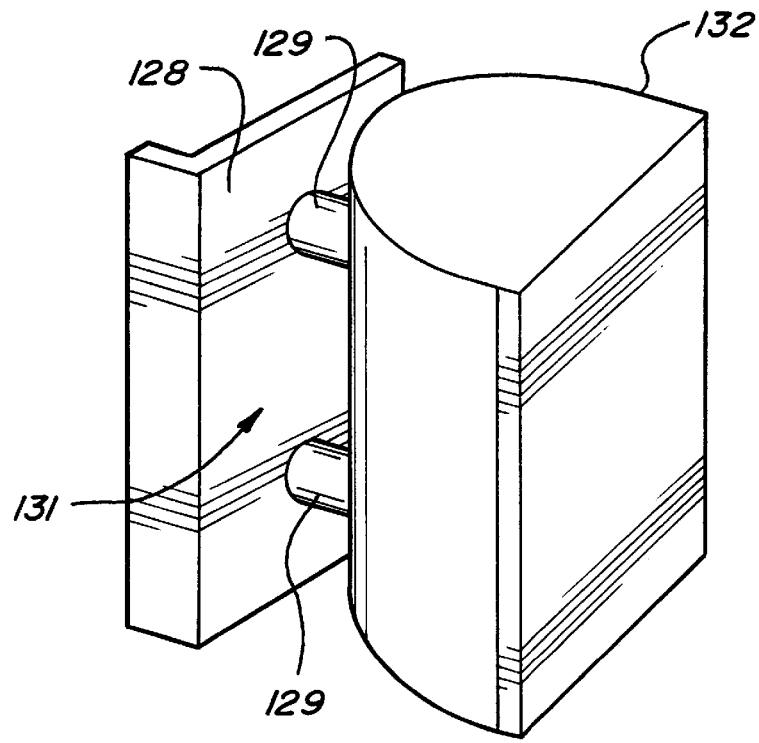
FIG. 6 is a perspective view of a seat frame and airbag shown in an alternative embodiment of the present invention.

An alternative embodiment is shown in FIG. 6 where an airbag module 132 is spaced from the frame member 128 by shoulder bolts 129 or other mounting device. This forms a slot 131 between the module and frame through which the force concentrator panels can pass to circumscribe the airbag without also circumscribing the frame member. The force of the inflating airbag will still be directed to the tear line or tear seam to ensure deployment of the airbag therethrough. It is possible to utilize the force concentrator with an airbag that is not directly mounted to the seat frame but is disposed and retained within a cavity in the seat pad. In such a case, the force concentrator need only circumscribe the airbag itself.

Figure 7:
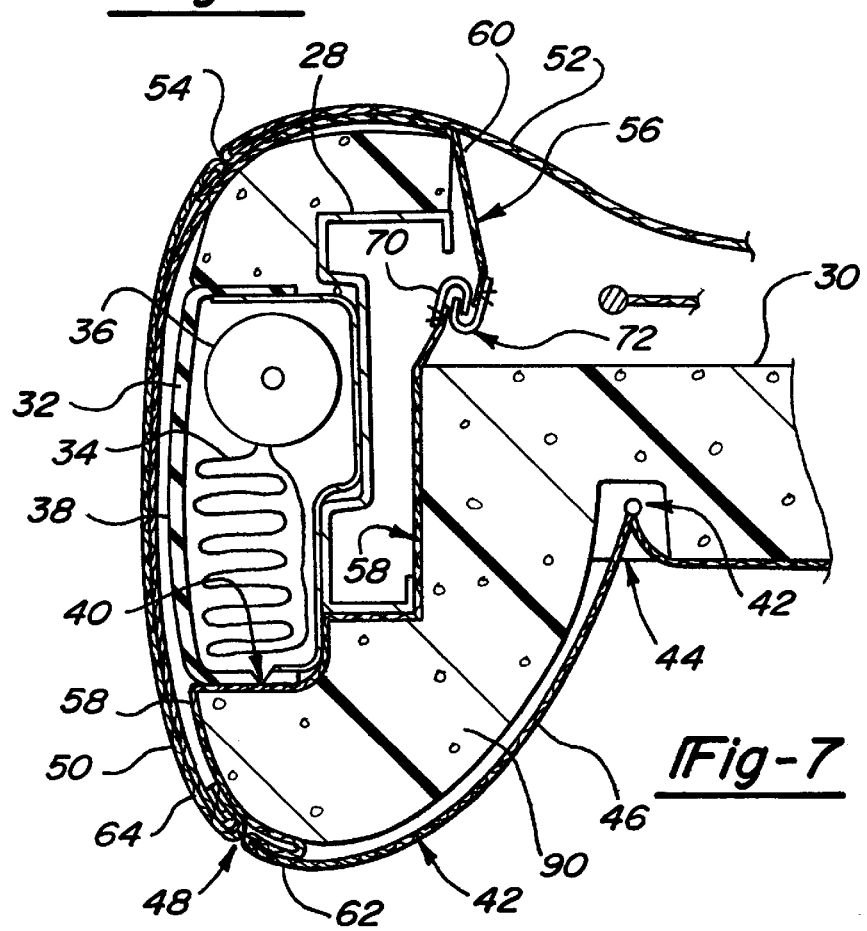
FIG. 7 is a sectional view like FIG. 2 illustrating an alternative embodiment of the present invention.

FIG. 7 illustrates another alternative embodiment of the present invention. Here the force concentrator panel 58 does not wrap around and circumscribe the foam 90 in the side bolster. Instead, the panel 58 extends from seam 48 between the foam and trim cover back to the module 38 and then between the foam and module to circumscribe the module and frame. This arrangement prevents foam fragmentation, especially when the module split line 40 is located on the front of the module instead of the side as shown in FIG. 2.

It is to be understood that the invention is not limited to the exact construction illustrated and described above, but that various changes and modifications may be made without departing from the spirit and scope of the invention as defined in the following claims.

We claim:

1. A vehicle seat comprising:

a frame member;

an inflatable airbag mounted to the frame member;

a trim cover substantially covering the frame member and airbag, the trim cover having a tear line therein coordinated with the airbag for the airbag to deploy through the trim cover by rupturing at the tear line upon inflation of the airbag; and a concentrator joined to the trim cover adjacent the tear line for concentrating the force of the inflating airbag upon the tear line to rupture the trim cover thereby enabling the airbag to deploy through the trim cover, the concentrator including a first panel and a second panel of flexible and substantially non-stretchable material having a tensile strength sufficient to withstand the force of the inflating airbag without tearing, the first and second panels having proximal ends joined to the trim cover on opposite sides of the tear line and extending in opposite directions therefrom beneath the trim cover to distal ends of the panels, the first and second panels being joined to one another at the distal ends thereof to form a sleeve circumscribing the airbag and frame member the first and second panels having a longitudinal dimension, measured perpendicular to the circumference of the sleeve, that is constant over a first portion of the sleeve circumference adjacent the tear line and a step down to a smaller longitudinal dimension over a second portion of the sleeve adjacent the distal ends of the first and second panels.

2. The seat of claim 1 wherein each of the first and second panels are attached to the trim cover by a stitched thread sewn to the trim cover on opposite sides of the tear line.

3. The seat of claim 1 wherein each of the first and second panels are adhesively bonded to the trim cover on opposite sides of the tear line.

4. The seat of claim 1 wherein the airbag, frame member and concentrator are located in a generally horizontal seat bottom.

5. The seat of claim 1 wherein the airbag, frame member and concentrator are located in a generally upright seat back.

6. The seat of claim 1 further comprising complementary fastener elements at the distal ends of the first and second panels for attaching the distal ends of the first and second panels to one another.

7. The seat of claim 1 further comprising a pad, the pad having a slot therethrough which the sleeve of the concentrator passes through whereby a portion of the pad is circumscribed by the sleeve.

8. The seat of claim 1 wherein the tear line is formed by a seam where two pieces of material are joined together to form the trim cover.

9. The seat of claim 8 wherein the seam is formed by a stitched thread and the first and second panels of the concentrator are joined to the seam by the stitched thread.

10. The seat of claim 1 wherein the first and second panels are made of a woven fabric.

11. The seat of claim 10 wherein the first and second panels are made of an airbag fabric.

12. The seat of claim 1 further comprising complementary hook fastener strips at the distal ends of the first and second panels for attaching the distal ends of the first and second panels to one another.

13. The seat of claim 12 wherein the hook fastener strips are made of metal.

14. The seat of claim 12 wherein the hook fastener strips are made of plastic.

15. The seat of claim 12 wherein the hook fastener strips are sewn to the first and second panels.

16. A vehicle seat comprising:

a frame member;

an inflatable airbag mounted to the frame member;

a trim cover substantially covering the frame member and airbag, the trim cover having a tear line therein coordinated with the airbag for the airbag to deploy through the trim cover by rupturing at the tear line upon inflation of the airbag; and a concentrator joined to the trim cover adjacent the tear line for concentrating the force of the inflating airbag upon the tear line to rupture the trim cover thereby enabling the airbag to deploy through the trim cover, the concentrator including a first panel and a second panel of flexible and substantially non-stretchable material having a tensile strength sufficient to withstand the force of the inflating airbag without tearing, the first and second panels having proximal ends joined to the trim cover on opposite sides of the tear line and extending in opposite directions therefrom beneath the trim cover to distal ends of the panels, the first and second panels being joined to one another at the distal ends thereof to form a sleeve circumscribing the airbag; and the first and second panels have a longitudinal dimension, measured perpendicular to the circumference of the sleeve, that is constant over a first portion of the sleeve circumference adjacent the tear line and a step down to a smaller longitudinal dimension over a second portion of the sleeve adjacent the distal ends of the first and second panels.

17. The seat of claim 16 further comprising complementary fastener elements coupled to the distal ends of the first and second panels for attaching the distal ends of the first and second panels to one another.

18. A vehicle seat comprising:

a frame member;

an inflatable airbag mounted to the frame member;

a trim cover substantially covering the frame member and airbag, the trim cover having a tear line therein coordinated with the airbag for the airbag to deploy through the trim cover by rupturing at the tear line upon inflation of the airbag;

a concentrator joined to the trim cover adjacent the tear line for concentrating the force of the inflating airbag upon the tear line to rupture the trim cover thereby enabling the airbag to deploy through the trim cover, the concentrator including a first panel and a second panel of flexible and substantially non-stretchable material having a tensile strength sufficient to withstand the force of the inflating airbag without tearing, the first and second panels having proximal ends joined to the trim cover on opposite sides of the tear line and extending in opposite directions therefrom beneath the trim cover to distal ends of the panels, the first and second panels being joined to one another at the distal ends thereof to form a sleeve circumscribing the airbag; and a pad, the pad having a slot therethrough which the sleeve passes through whereby a portion of the pad is circumscribed by the sleeve.

19. The seat of claim 18 wherein the tear line is formed by a seam where two pieces of material are joined together to form the trim cover.

20. The vehicle seat of claim 18 wherein the first and second panels have a longitudinal dimension, measured perpendicular to the circumference of the sleeve, that has a first value measured at the tear line and a second value measured at the distal ends of the panels which is smaller than the first value.

21. The seat of claim 18 further comprising complementary hook fastener strips coupled to the distal ends of the first and second panels for attaching the distal ends of the first and second panels to one another.

22. The vehicle seat of claim 18 wherein the first and second panels have a longitudinal dimension, measured perpendicular to the circumference of the sleeve, that is constant over a first portion of the sleeve circumference adjacent the tear line and a step down to a smaller longitudinal dimension over a second portion of the sleeve adjacent the distal ends of the first and second panels.

23. The vehicle seat of claim 18 further comprising complementary fastener elements coupled to the distal ends of the first and second panels for attaching the distal ends of the first and second panels to one another.

24. A vehicle seat comprising:
a frame member;
an inflatable airbag mounted to the frame member;
a trim cover substantially covering the frame member and airbag, the trim cover having a tear line therein coordinated with the airbag for the airbag to deploy through the trim cover by rupturing at the tear line upon inflation of the airbag; and
concentrator means joined to the trim cover adjacent the tear line for concentrating the force of the inflating airbag upon the tear line to rupture the trim cover thereby enabling the airbag to deploy through the trim cover, the concentrator means including a first panel and a second panel of flexible and substantially non-stretchable material having a tensile strength sufficient to withstand the force of the inflating airbag without tearing, the first and second panels having proximal ends joined to the trim cover on opposite sides of the tear line and extending in opposite directions therefrom beneath the trim cover to distal ends of the panels, the first and second panels being joined to one another at the distal ends thereof to form a sleeve circumscribing the airbag, the first and second panels having a longitudinal dimension, measured perpendicular to the circumference of the sleeve, that has a first value measured at the tear line and a second value measured at the distal ends of the panels which is smaller than the first value.

25. A vehicle seat comprising:
a frame member;
an inflatable airbag mounted to the frame member;
a trim cover substantially covering the frame member and airbag, the trim cover having a tear line therein coordinated with the airbag for the airbag to deploy through the trim cover by rupturing at the tear line upon inflation of the airbag; and
a concentrator joined to the trim cover adjacent the tear line for concentrating the force of the inflating airbag upon the tear line to rupture the trim cover thereby enabling the airbag to deploy through the trim cover, the concentrator including a first panel and a second panel of flexible and substantially non-stretchable material having a tensile strength sufficient to withstand the force of the inflating airbag without tearing, the first and second panels having proximal ends joined to the trim cover on opposite sides of the tear line and extending in opposite directions therefrom beneath the trim cover to distal ends of the panels, the first and second panels being joined to one another at the distal ends thereof to form a sleeve circumscribing the airbag and frame member; and
a pad, the pad having a slot therethrough which the sleeve passes through whereby a portion of the pad is circumscribed by the sleeve.

26. The seat of claim 25 further comprising complementary hook fastener strips at the distal ends of the first and second panels for attaching the distal ends of the first and second panels to one another.

27. The seat of claim 25 wherein each of the first and second panels are adhesively bonded to the trim cover on opposite sides of the tear line.

28. The seat of claim 25 further comprising complementary fastener elements coupled to the distal ends of the first and second panels for attaching the distal ends of the first and second panels to one another.

29. The seat of claim 25 wherein each of the first and second panels are attached to the trim cover by a stitched thread sewn to the trim cover on opposite sides of the tear line.

30. The vehicle seat of claim 29 wherein the first and second panels have a longitudinal dimension, measured perpendicular to the circumference of the sleeve, that has a first value measured at the tear seam and a second value measured at the distal ends of the panels which is smaller than the first value.

31. A vehicle seat comprising:
a frame member;
an inflatable airbag mounted to the frame member;
a trim cover substantially covering the frame member and airbag, the trim cover having a tear line therein coordinated with the airbag for the airbag to deploy through the trim cover by rupturing at the tear line upon inflation of the airbag; and
a concentrator joined to the trim cover adjacent the tear line for concentrating the force of the inflating airbag upon the tear line to rupture the trim cover thereby enabling the airbag to deploy through the trim cover, the concentrator including a first panel and a second panel of flexible and substantially non-stretchable material having a tensile strength sufficient to withstand the force of the inflating airbag without tearing, the first and second panels having proximal ends joined to the trim cover on opposite sides of the tear line and extending in opposite directions therefrom beneath the trim cover to distal ends of the panels, the first and second panels being joined to one another at the distal ends thereof to form a sleeve circumscribing the airbag and frame member; and
complementary hook fastener strips coupled to the distal ends of the first and second panels for attaching the distal ends of the first and second panels to one another.

32. The seat of claim 31 wherein the hook fastener strips are made of plastic.

33. The seat of claim 31 wherein the hook fastener strips are sewn to the first and second panels.

34. The seat of claim 31 wherein the hook fastener strips are made of metal.

35. A vehicle seat comprising:
a frame member;
an inflatable airbag mounted to the frame member;
a trim cover substantially covering the frame member and airbag, the trim cover having a tear line therein coordinated with the airbag for the airbag to deploy through the trim cover by rupturing at the tear line upon inflation of the airbag;
concentrator means joined to the trim cover adjacent the tear line for concentrating the force of the inflating airbag upon the tear line to rupture the trim cover thereby enabling the airbag to deploy through the trim cover, the concentrator means including a first panel and a second panel of flexible and substantially non-stretchable material having a tensile strength sufficient to withstand the force of the inflating airbag without tearing, the first and second panels having proximal ends joined to the trim cover on opposite sides of the tear line and extending in opposite directions therefrom beneath the trim cover to distal ends of the panels, the first and second panels being joined to one another at the distal ends thereof to form a sleeve circumscribing the airbag; and first and second complementary fastener elements coupled to the distal ends of the first and second panels respectively for attachment to one another whereby the distal ends of the first and second panels are attached to one another.

36. A vehicle seat comprising:

a frame member;

an inflatable airbag mounted to the frame member;

a trim cover substantially covering the frame member and airbag, the trim cover having a tear line therein coordinated with the airbag for the airbag to deploy through the trim cover by rupturing at the tear line upon inflation of the airbag; and a concentrator joined to the trim cover adjacent the tear line for concentrating the force of the inflating airbag upon the tear line to rupture the trim cover thereby enabling the airbag to deploy through the trim cover, the concentrator including a first panel and a second panel of flexible and substantially non-stretchable material having a tensile strength sufficient to withstand the force of the inflating airbag without tearing, the first and second panels having proximal ends joined to the trim cover on opposite sides of the tear line and extending in opposite directions therefrom beneath the trim cover to distal ends of the panels, the first and second panels being joined to one another at the distal ends thereof to form a sleeve circumscribing the airbag; and complementary hook fastener strips coupled to the distal ends of the first and second panels for attaching the distal ends of the first and second panels to one another.

37. The seat of claim 36 wherein the hook fastener strips are made of metal.

38. The seat of claim 36 wherein the hook fastener strips are made of plastic.

39. The seat of claim 36 wherein the hook fastener strips are sewn to the first and second panels.

40. A vehicle seat comprising:

a frame member;

an inflatable airbag mounted to the frame member;

a trim cover substantially covering the frame member and airbag, the trim cover having a tear line therein coordinated with the airbag for the airbag to deploy through the trim cover by rupturing at the tear line upon inflation of the airbag;

concentrator means joined to the trim cover adjacent the tear line for concentrating the force of the inflating airbag upon the tear line to rupture the trim cover thereby enabling the airbag to deploy through the trim cover, the concentrator means including a first panel and a second panel of flexible and substantially non-stretchable material having a tensile strength sufficient to withstand the force of the inflating airbag without tearing, the first and second panels having proximal ends joined to the trim cover on opposite sides of the tear line and extending in opposite directions therefrom beneath the trim cover to distal ends of the panels, the first and second panels being joined to one another at the distal ends thereof to form a sleeve circumscribing the airbag; and first and second complementary zipper elements coupled to the distal ends of the first and second panels respectively for attachment to one another whereby the distal ends of the first and second panels are attached to one another.

* * * * *

UNITED STATES PATENT AND TRADEMARK OFFICE
CERTIFICATE OF CORRECTION

PATENT NO : 5,967,603
DATED : October 19, 1999
INVENTOR(S) : John Genders, Michael Steward, Mark Morrison.

It is certified that error appears in the above-identified patent and that said Letters Patent is hereby corrected as shown below:

In Column 10, Line 15, Claim 30, "seam should read --line--.

Signed and Sealed this

First Day of August, 2000

Attest:

Q. TODD DICKINSON

Attesting Officer

Director of Patents and Trademarks